(12) United States Patent
Heilig et al.

(10) Patent No.: US 6,474,733 B1
(45) Date of Patent: Nov. 5, 2002

(54) INFLATABLE HEADREST

(75) Inventors: Alexander Heilig, Wissgoldingen; Lothar Zink, Alfdorf, both of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/552,839

(22) Filed: Apr. 20, 2000

(30) Foreign Application Priority Data

Apr. 23, 1999 (DE) ..................................... 299 07 245 U

(51) Int. Cl.[7] .................................................. B60N 2/42
(52) U.S. Cl. .................................. 297/216.12; 297/391
(58) Field of Search ............................. 297/216.12, 391

(56) References Cited

U.S. PATENT DOCUMENTS

| | | | | |
|---|---|---|---|---|
| 4,720,146 A | * | 1/1988 | Mawbey et al. | 297/409 |
| 4,778,218 A | * | 10/1988 | Suman | 297/391 |
| 4,865,388 A | * | 9/1989 | Nemoto | 297/403 |
| 5,842,738 A | * | 12/1998 | Knoll et al. | 297/216.12 |
| 5,911,433 A | * | 6/1999 | Swann | 280/730.2 |
| 5,975,637 A | | 11/1999 | Guess et al. | |
| 6,079,776 A | * | 6/2000 | Breitner et al. | 297/216.12 |
| 6,149,231 A | * | 11/2000 | Wustholz | 297/216.12 |
| 6,213,548 B1 | * | 4/2001 | Van Wynsbeghe et al. | 297/216.12 |

FOREIGN PATENT DOCUMENTS

| | | |
|---|---|---|
| DE | 4227697 | 2/1994 |
| DE | 19733030 | 10/1998 |
| DE | 19739131 | 12/1998 |
| DE | 19756700 | 12/1998 |
| JP | 11034711 | 2/1999 |
| WO | 9857818 | 12/1998 |

* cited by examiner

Primary Examiner—Peter M. Cuomo
Assistant Examiner—Joseph Edell
(74) Attorney, Agent, or Firm—Tarolli, Sundheim, Covell, Tummino Szabo L.L.P.

(57) ABSTRACT

A headrest in a vehicle seat includes an inflatable protective cushion in which the contact surface area is increased and caused to approach the head without needing to provide burst seams in the upholstery or in the cover or to make use of an elastic covering material. The protective cushion is arranged between the headrest frame member and the upholstery. The cover or the upholstery is joined at its outer circumference by jointing means to the headrest frame member. The jointing means maintain the cover, or the upholstery, tensioned in the non-activated condition of the protective cushion and permit a limited displacement of the outer circumference of the cover, or upholstery, from the headrest frame member in the activated condition of the protective cushion. The upholstery may thus be brought by the protective cushion nearer to the head and the contact surface area may be enlarged without destroying the cover or upholstery.

10 Claims, 10 Drawing Sheets

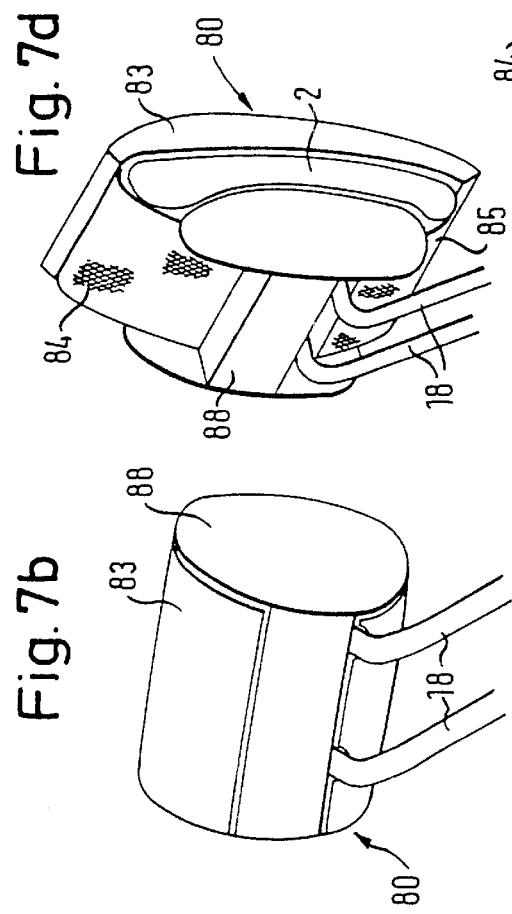
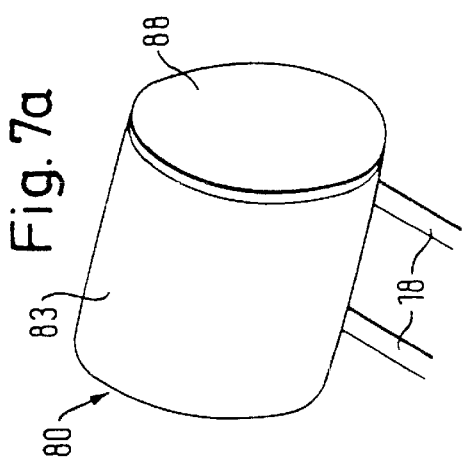
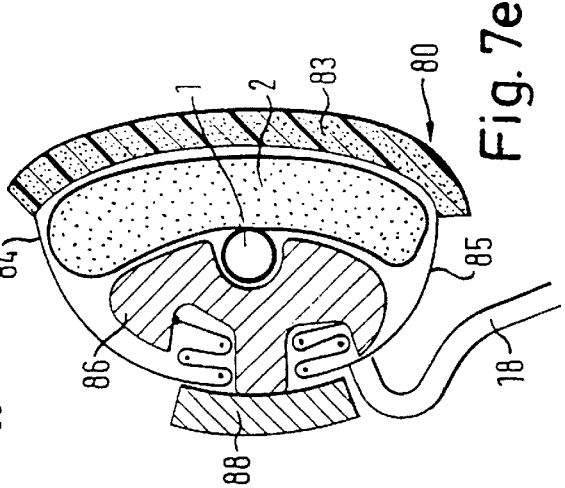
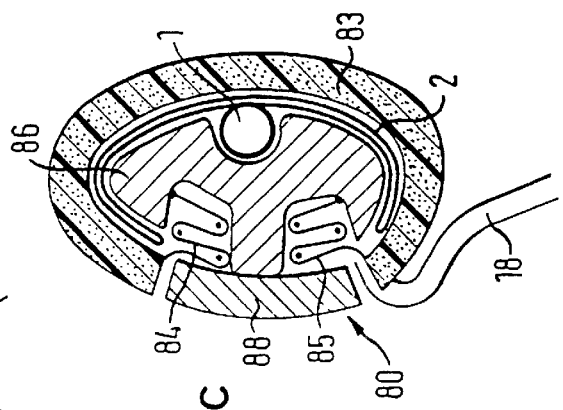

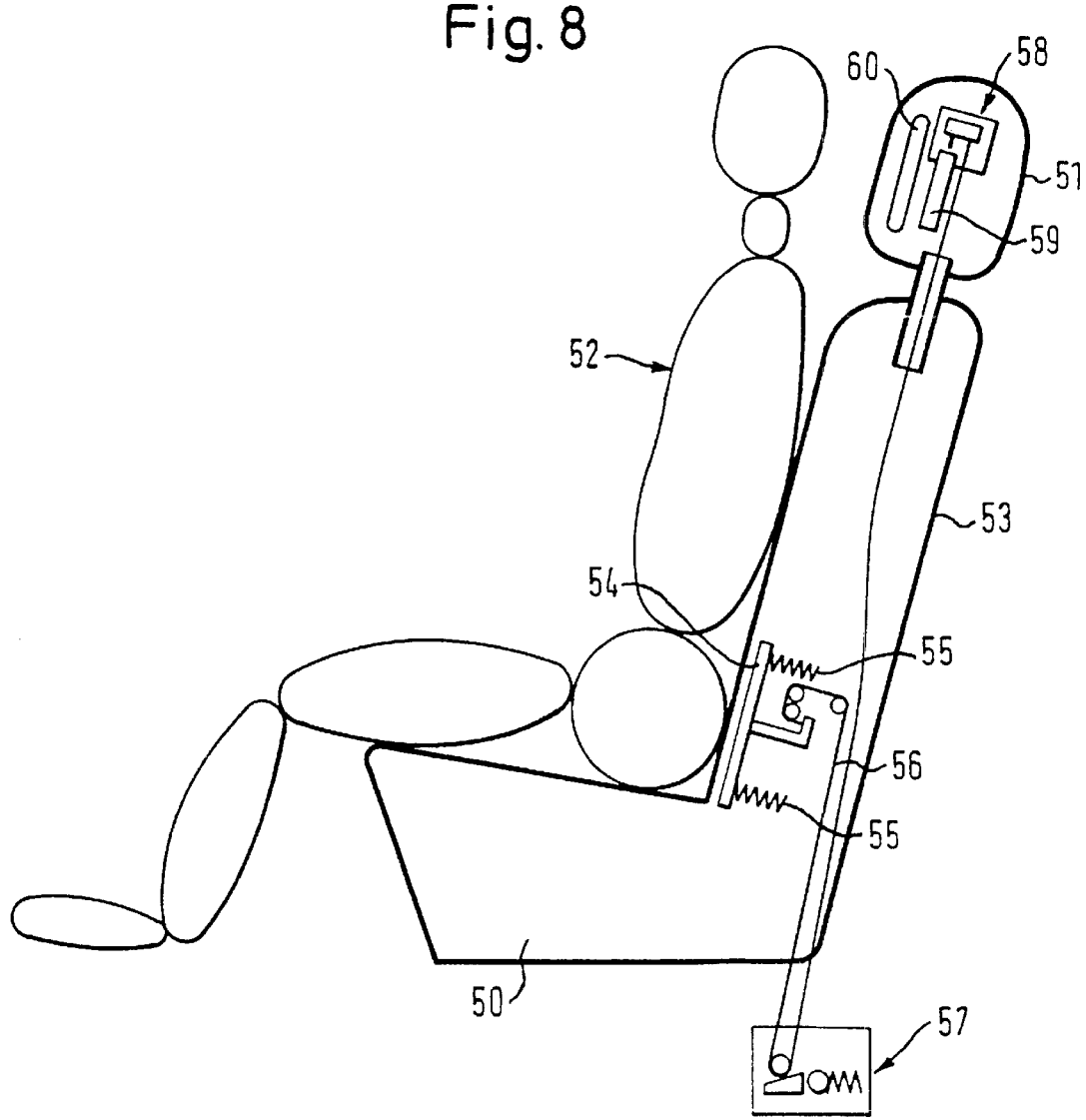

INFLATABLE HEADREST

The present invention relates to a headrest including an inflatable protective cushion activated in the case of a rear-end impact.

BACKGROUND OF THE INVENTION

In a rear-end impact a vehicle occupant is exposed to added risk of injury in the region of the nape of the neck due to shear and bending forces when the head is not in contact with the headrest. This is, however, mostly the case since the vehicle occupant when on the move often shifts to a more comfortable seating position which is not always an optimum from the safety point of view. To reduce this risk of injury headrests have been developed with which by means of an inflatable protective cushion the contact surface area of the upholstery of the headrest is increased whilst being caused to approach the head. So that a movement of the headrest upholstery is possible, known headrests are provided with either an elastic covering material or seams in the covering material which burst on inflation of the protective cushion to thus deploy a folded portion of the cover and thereby permit expansion of the protective cushion. This results in the cover being irreversibly damaged once the protective cushion has been deployed. Apart from this, providing these burst seams constitutes an additional, not inconsiderable complication in fabricating the headrest. When employing an elastic covering material the choice of material is substantially restricted due to the required elastic properties which affects the costs and freedom in visual design of the headrest.

BRIEF SUMMARY OF THE INVENTION

The present invention provides a headrest including an inflatable protective cushion in which the contact surface area is increased and caused to approach the head without needing to provide burst seams in the upholstery or in the cover or to make use of an elastic covering material.

The protective cushion is arranged between the headrest frame member and the upholstery. The cover or the upholstery is joined at its outer circumference by jointing means to the headrest frame member. The jointing means maintain the cover, or the upholstery, tensioned in the non-activated condition of the protective cushion and permit a limited displacement of the outer circumference of the cover, or upholstery, from the headrest frame member in the activated condition of the protective cushion. Thus, the upholstery may be brought by the protective cushion nearer to the head and the contact surface area may be enlarged without destroying the cover or upholstery. The upholstery and/or the cover may be returned to their original positions after having been activated.

Furthermore, the invention provides an activating means which on detection of a rear-end impact activates a gas source for inflating the protective cushion, the activating means comprising a pressure sensor responding to the pressure exerted by the occupant on the backrest of the vehicle seat, and an acceleration sensor applied to the vehicle body or to the seat and which activates the gas source only when pressure is exerted by the occupant on the backrest and simultaneously the acceleration sensor signals a rear-end impact. It is this activating means that prevents the protective cushion in the headrest from being inflated when despite pressure being exerted on the backrest no rear-end impact is involved or when the corresponding vehicle seat is not occupied.

BRIEF DESCRIPTION OF THE DRAWINGS

Further features and advantages of the invention read from the following description and from the drawings illustrating embodiments of the invention by way of example and to which reference is made, in which

FIG. 7a is a view of a headrest in accordance with a fourth embodiment of the invention in an inclined front view;

FIG. 7b is a view of a headrest as shown in FIG. 7a in an inclined rear view in the non-activated condition;

FIG. 7c is a section through the headrest as shown in FIG. 7a;

FIG. 7d is a view of the headrest as shown in FIG. 7a in the activated condition;

FIG. 7e is a section through the headrest as shown in FIG. 7a in the activated condition.

FIG. 8 is a schematic section through a vehicle seat including an activating means in accordance with a first embodiment of the invention in the non-activated condition of the headrest;

DETAILED DESCRIPTION OF THE INVENTION

Figure 1:
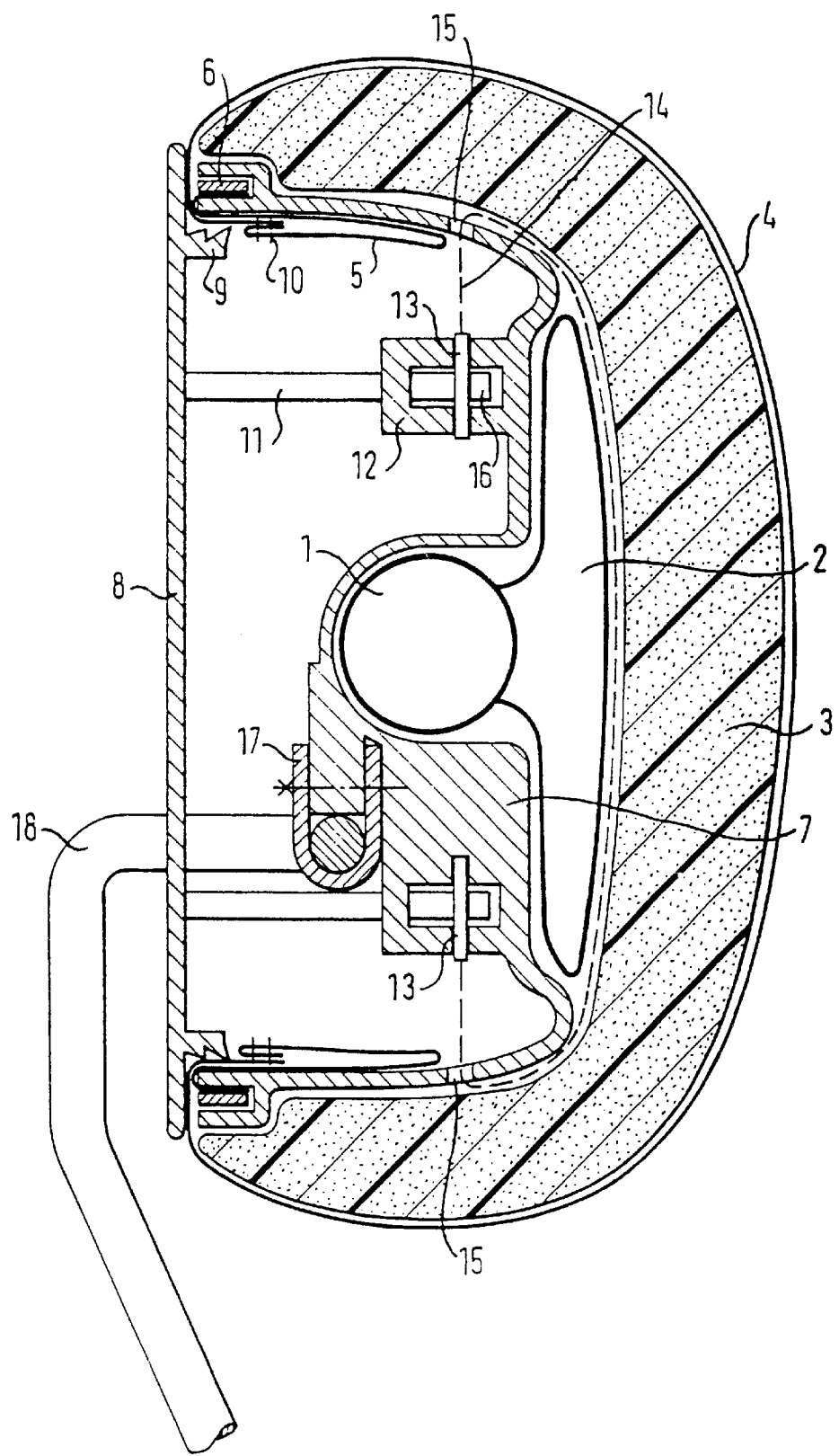
FIG. 1 is a section through a headrest in accordance with a first embodiment of the invention in the non-activated condition.
Figure 2:
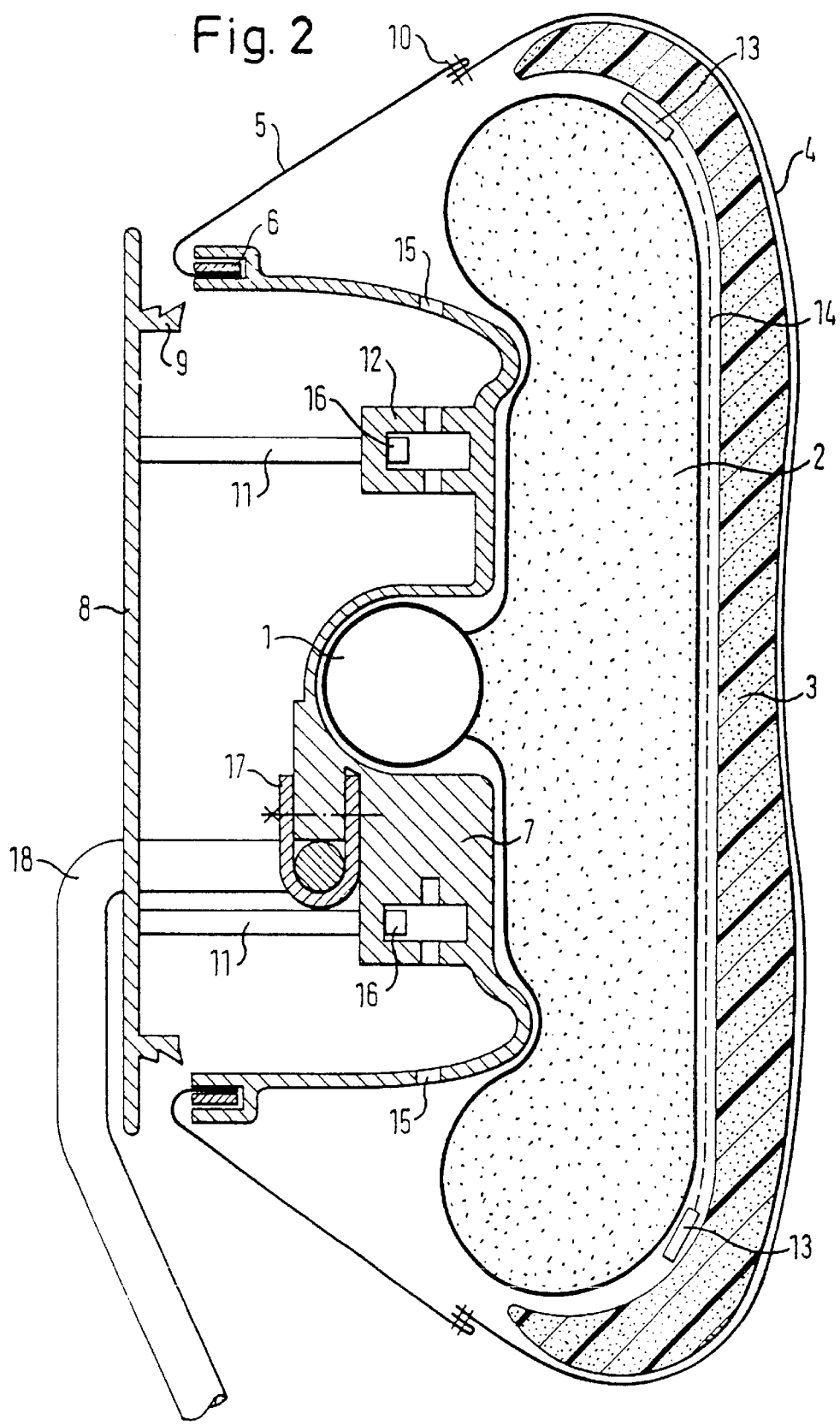
FIG. 2 is a section through the headrest as shown in FIG. 1 but in the activated condition.

Referring now to FIGS. 1 and 2 there is illustrated the headrest comprising a gas source 1, for example a pyrotechnic gas generator or a compressed gas cartridge, and an inflatable protective cushion 2, all of which are provided between an upholstery 3 and a headrest frame member 7. A cover 4 covers the upholstery 3. The cover 4 is extended in length by a jointing means configured as a jointing hem 5 folded into a recess in the rear side of the headrest frame member 7 and is held in place by means of a clamping strip 6 in a groove in the headrest frame member 7. Applied to the jointing hem 5 is a circumferential seam 10 by means of which the jointing hem 5 is clasped by a flange 9 applied to a panel 8 on the headrest frame member 7. The panel 8 is held in place on the headrest frame member 7 by a holding device comprising latching hooks 11 configured on the panel 8 each constituting a stop 16 and a dome 12 configured on the frame member 7 with a pin 13 slidingly guided therein. The two pins 13 are connected via traction means 14, for example a traction tape which is guided through openings 15 in the frame member 7 and extending between the protective cushion 2 and the upholstery 3. The frame member 7 is secured by a clip fastener 17 to a headrest bracket 18.

In a rear-end impact the gas source 1 is activated to inflate the protective cushion 2. The enlargement of the protective cushion 2 draws the pins 13 from the domes 12 by the traction tape 14, as a result of which the stops 16 of the latching hooks 11 are released. The protective cushion simultaneously generates via the upholstery 3 and the cover 4 in the jointing hem 5 a tractive stress, resulting in the seam 10 clasped by the flange 9 pulling the panel 8 from the frame member 7 to the rear until the panel 8 is retained by the stops 16 of the latching hooks 11 at the domes 12 (see FIG. 2). The protective cushion 2 moves the upholstery 3 away from the frame member 7 until the jointing hem 5 is totally removed from the rear side recess in the frame member 7 and is extended. Due to the expansion of the protective cushion 2 vertically the upholstery 3 is simultaneously extended and thus the contact surface area enlarged for the head.

It is thus clearly evident that activation of the headrest causes damage neither to the cover nor to the upholstery since no burst seams are provided. All that is required to reinstate the headrest is to change the gas source 1 and, if need be, the protective cushion 2. All other components can be simply returned to their original condition by folding the loop 5 back in the rear side recess in the frame member 7 in the headrest, the pins threaded in place and the panel 8 refitted. Due to the panel 8 being arrested by means of the stops 16 to the latching hooks 11 there is no danger of the vehicle occupants being injured by loose parts. Instead of the upholstery 3 with the cover 4 an upholstery may also be employed in which the cover is worked into the surface, or the surface of which does away with the need of a separate cover, the jointing hem 5 then being directly tacked to the upholstery.

In the description of the following embodiments like components are identified by like reference numerals so that reference can be made to the above description as regards the components concerned.

Figure 3:
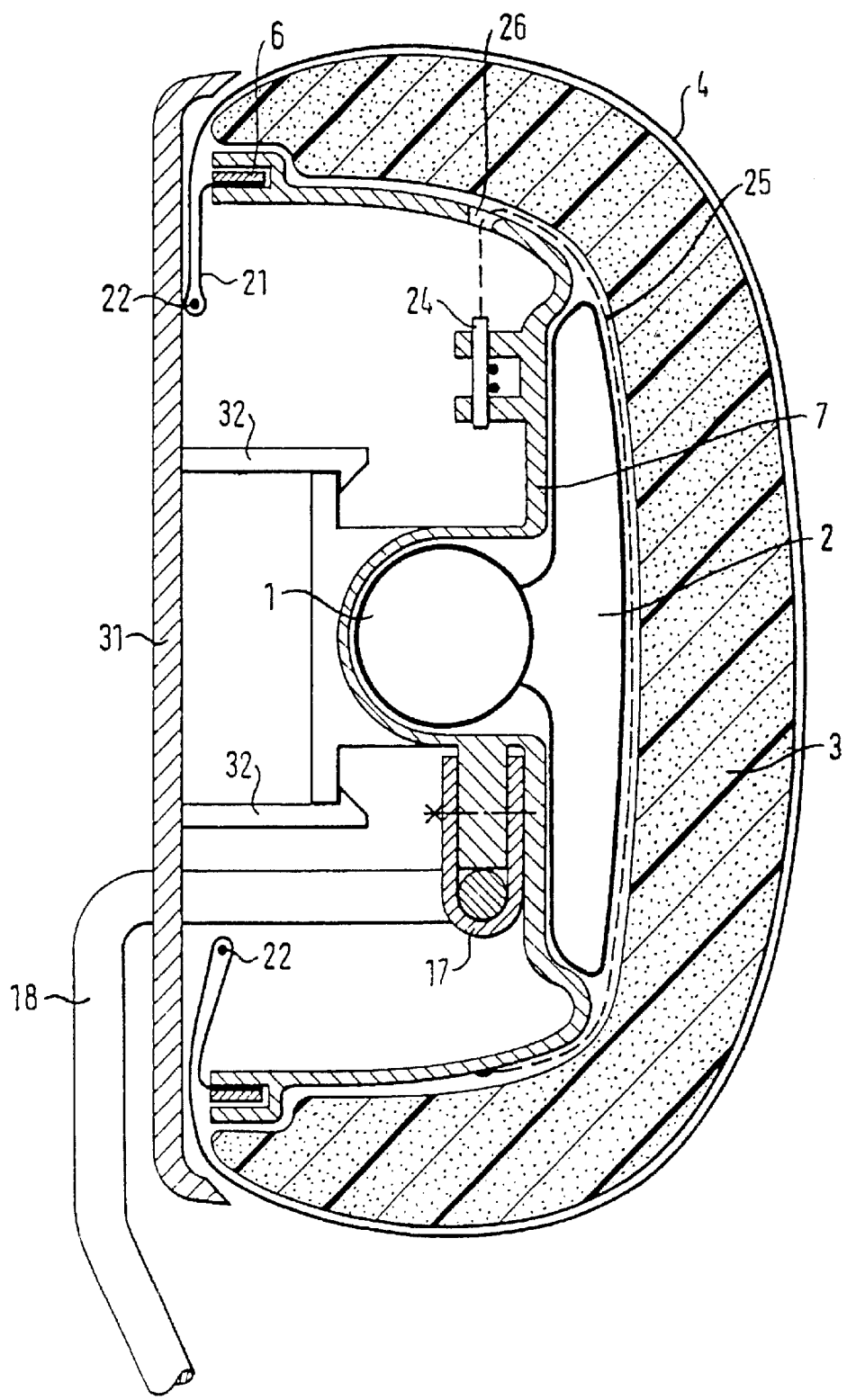
FIG. 3 is a section through a headrest in accordance with a second embodiment of the invention in the non-activated condition.
Figure 4:
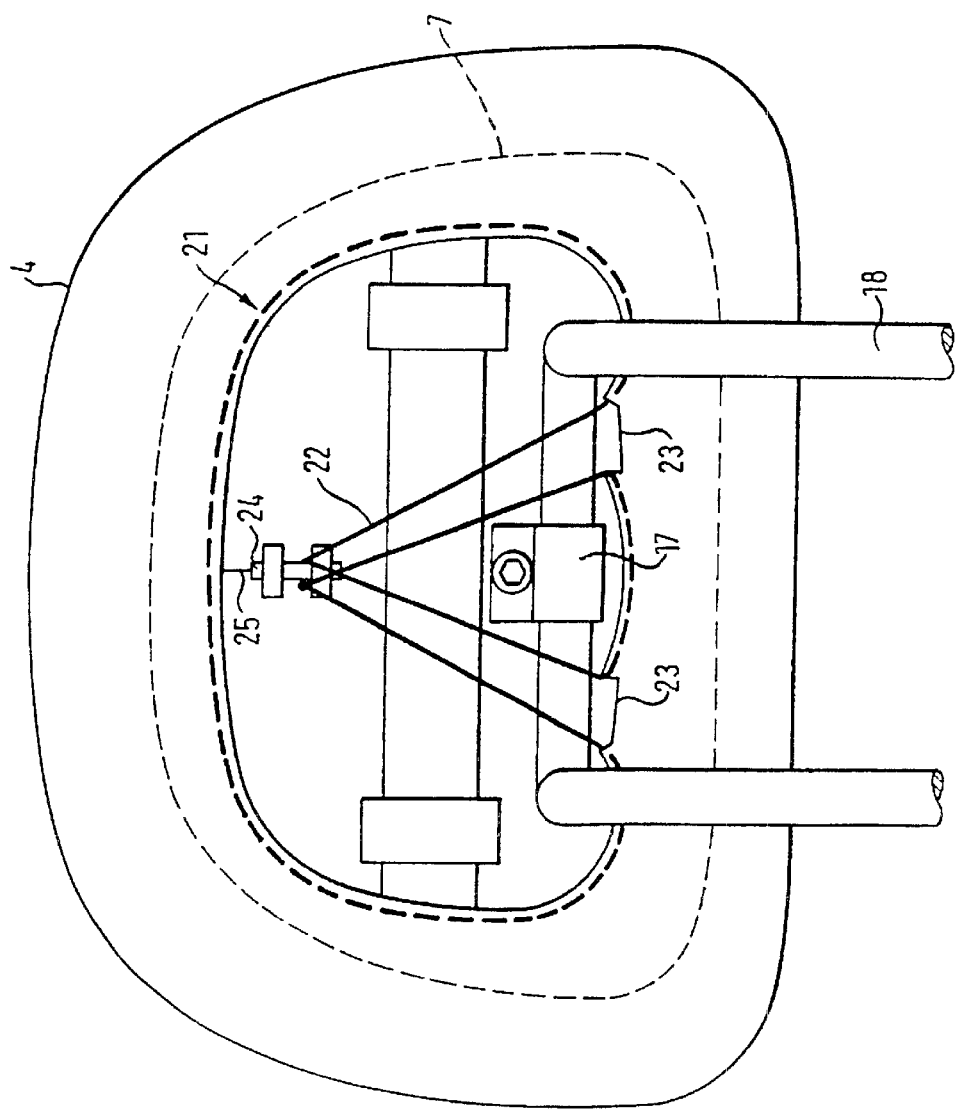
FIG. 4 is a view of the headrest as shown in FIG. 3 from the rear.

Referring now to FIGS. 3 and 4 there is illustrated a headrest in which the cover is extended in length beyond the end of the upholstery 3 and secured by means of the clamping strip 6 directly in the groove in the headrest frame member 7. The cover 4 forms a loop 21 which is maintained tensioned by a traction means located therein in the form of a tensioning cord 22. The tensioning cord 22 is brought out at two openings 23 in the loop 21 and wrapped around a pin 24 which is shiftingly mounted in an indent in the frame member 7. Applied to the pin 24 is a traction means 25, for instance a tape, which is guided through an opening 26 in the frame member between the protective cushion 2 and the upholstery 3 and secured at the other end to the frame member 7. The rear side recess of the frame member 7 is closed off by a panel 31 secured to the frame member 7 by latching hooks 32. Activation of the gas source 1 pulls the pin 24 from its guide due to inflation of the protective cushion 2 and releases the tensioning cord 22, as a result of which the loop 21 is released and the upholstery extended and moved away from the frame member as already described with reference to FIG. 1.

In addition to the advantages already described with reference to FIG. 1 this embodiment has the added advantage that the panel 31 remains on the frame member 7 and the headrest thus comprises a closed surface on the rear side even in the activated condition. The loop 21 may also be formed by a jointing hem directly stitched to the cover 4 for which a more moderately priced material may be used to advantage.

Figure 5:
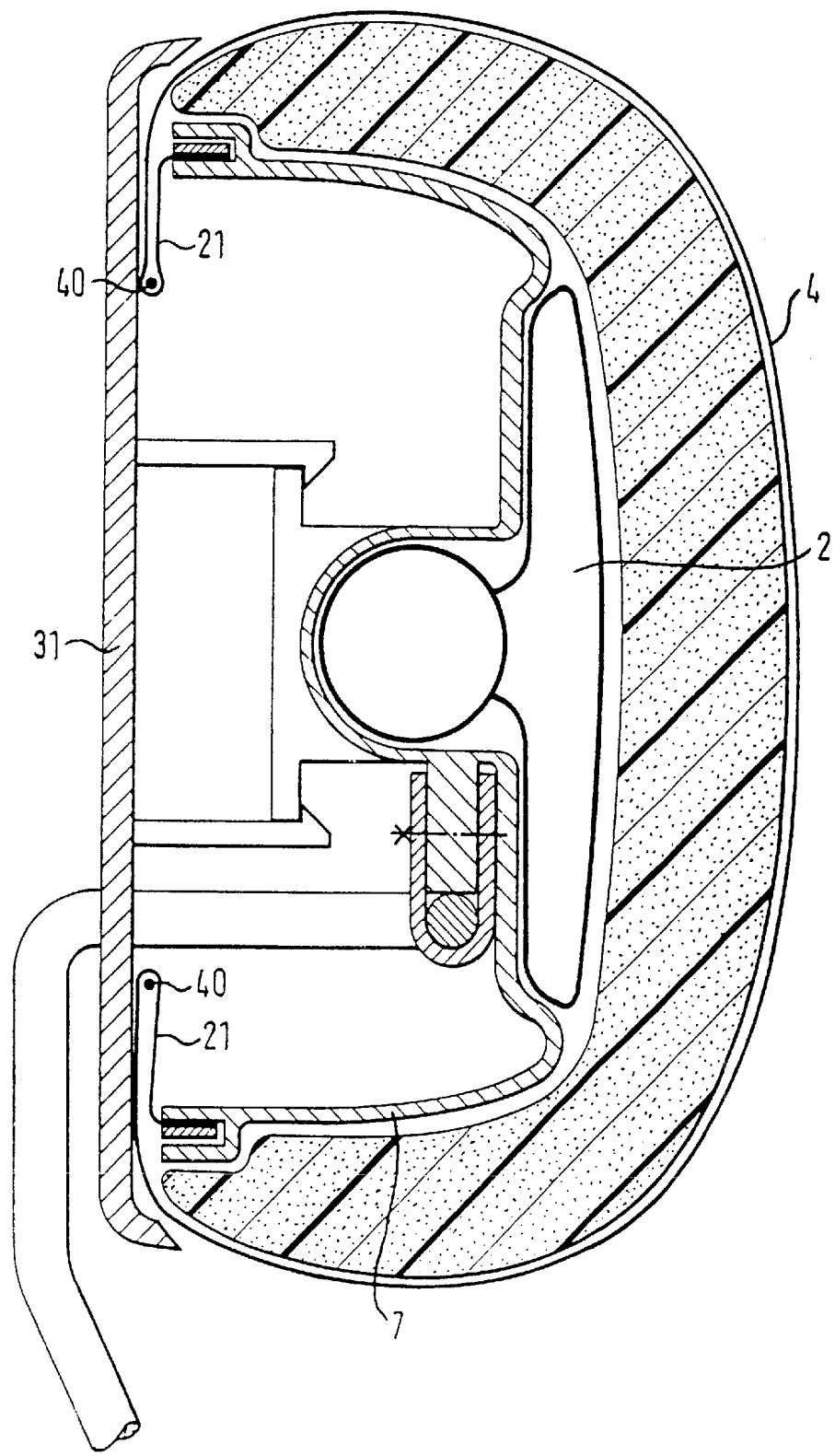
FIG. 5 is a section through a headrest in accordance with a third embodiment of the invention in the non-activated condition.
Figure 6:
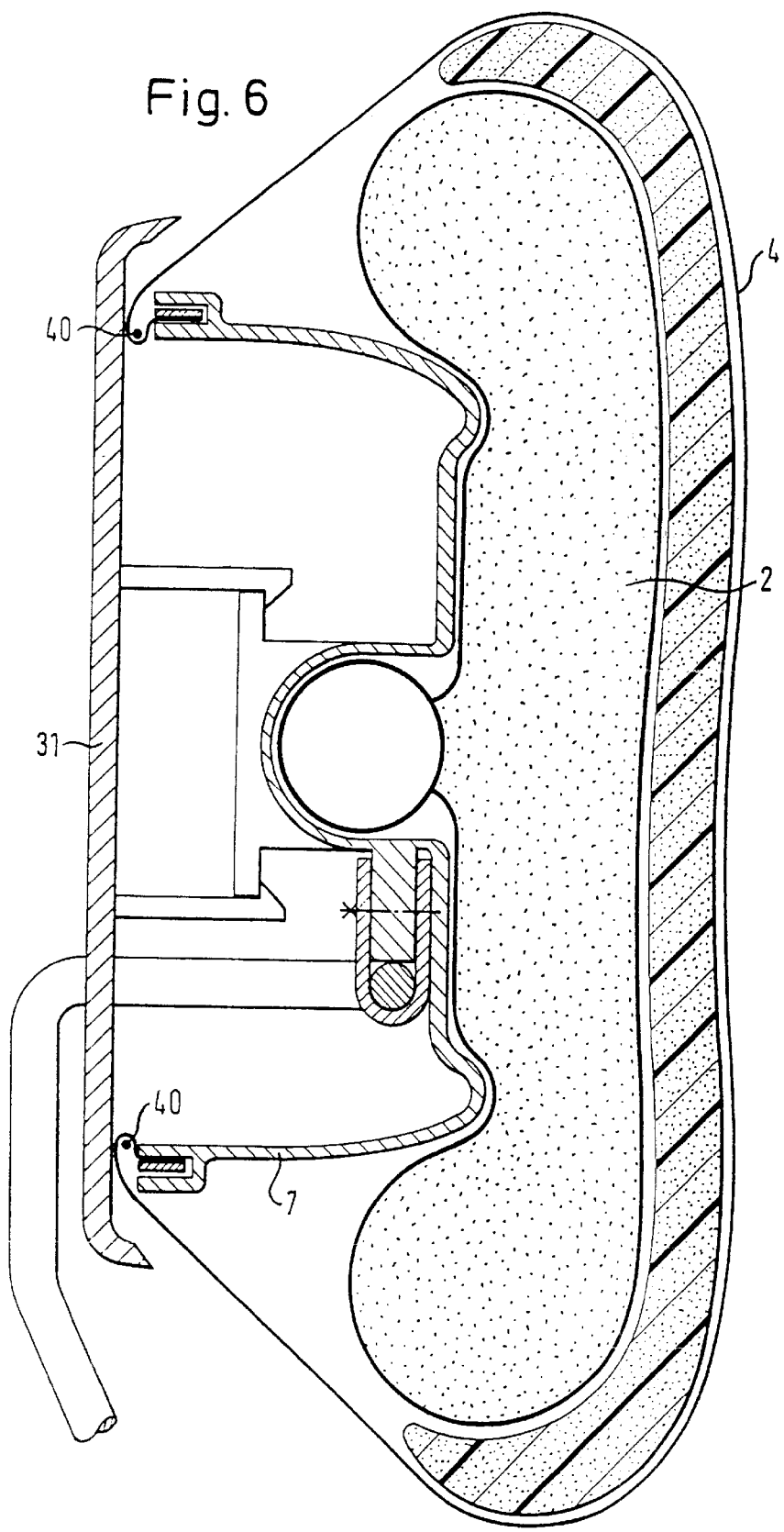
FIG. 6 illustrates the headrest as shown in FIG. 5 but in the activated condition.

Referring now to FIGS. 5 and 6 there is illustrated a headrest in which the loop 21 is maintained tensioned by an elastic traction means 40. This elastic traction means may be, for example, a coil-spring tape which is expanded on inflation of the protective cushion 2 by the tension in the cover 4 so that the upholstery 3 is extended and can be moved away from the frame member 7. When the pressure in the protective cushion 2 drops, the loop 21 of the cover 4 is drawn back under the panel 31 by the tension of the coil-spring tape so that the upholstery reassumes its original shape. It is particularly of advantage in this embodiment that the headrest reassumes its original shape by itself.

Referring now to FIGS. 7a to 7e there is illustrated a headrest 80 in accordance with a fourth embodiment of the invention in which the upholstery consists of a fixed part 88 and a movable part 83. The fixed part 83 of the upholstery surrounds the headrest in the non-activated condition (FIGS. 7a, 7b and 7c) for the most part. The upper end and lower end of the movable part 83 of the upholstery are each joined to the frame member 86 of the headrest by an elastic fabric 84, 85. This elastic fabric 84, 85 is accommodated in a recess in the frame member 86 where it is looped about reversing rods. In the activated condition (FIGS. 7d and 7e) the upholstery part 83 is extended and moved away from the frame member 86 by the inflation of the protective cushion 2 the same as described before, the elastic fabric 84, 85 being thereby expanded. With the drop in pressure in the protective cushion 2 the upholstery is caused to reassume its original shape by the tension in the elastic fabric 84, 85. Due to the tape 84, 85 being looped about the reversing rods a sufficient length of the elastic tape 84, 85 is made available to permit the necessary expansion for the travel of the upholstery part 83.

In this embodiment no additional tensioning means are needed, there also being no need for a separate panel on the rear side since the headrest in the non-activated condition is totally enclosed by the upholstery parts 83 and 88. This has the added advantage that the headrest comprises a closed and upholstered surface on all sides. Instead of the looped elastic tape it is here also possible to use one or more traction springs, this necessitating, however, reinforcement of the upper and lower edge of the movable upholstery 83 at the fastening points of the springs.

Figure 9:
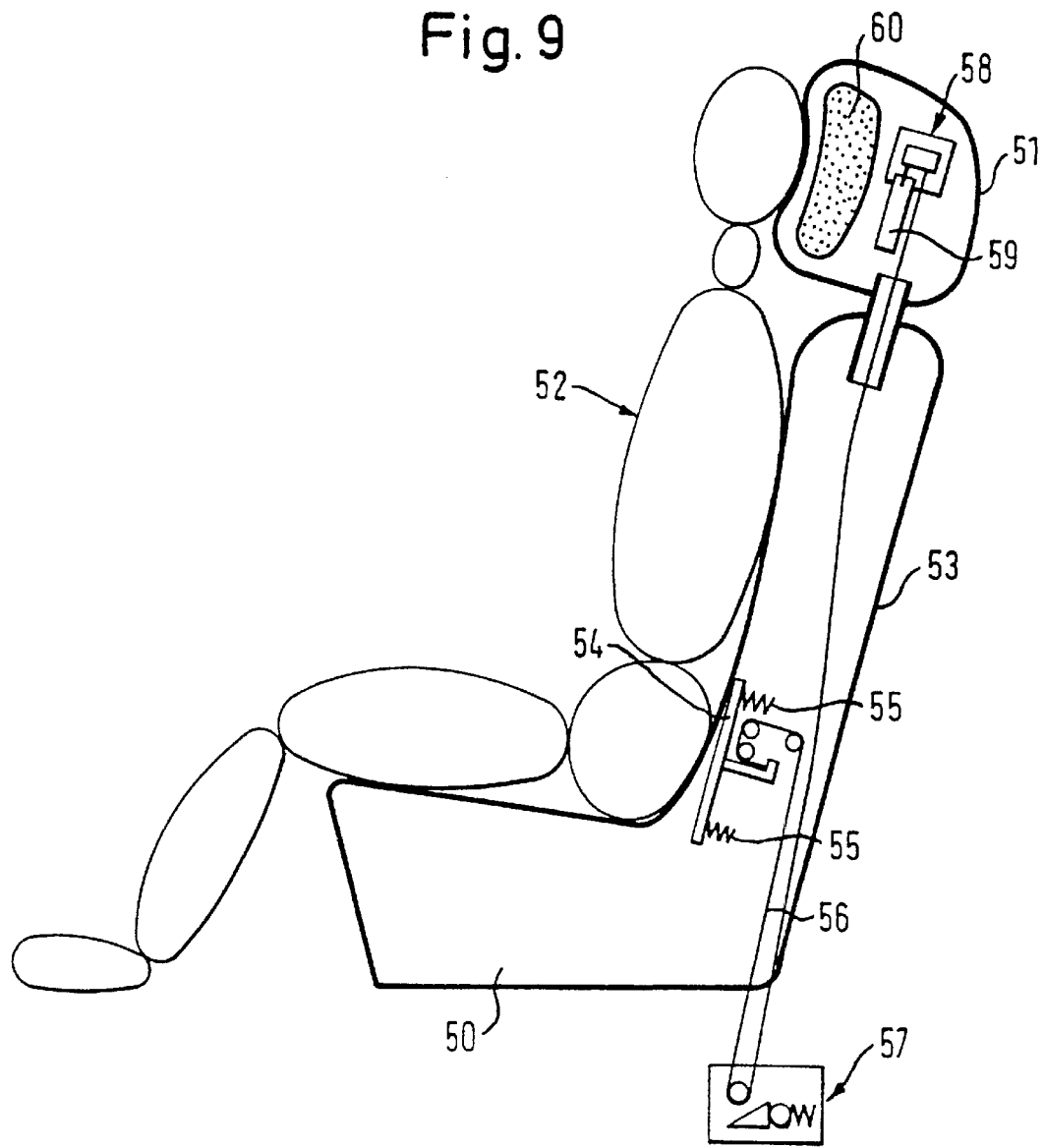
FIG. 9 is a schematic section through a vehicle seat as shown in FIG. 8 in the activated condition of the headrest.

Referring now to FIGS. 8 and 9 there is illustrated a vehicle seat 50 including a backrest 53 and a headrest 51. The headrest comprises an inflatable protective cushion 60 and a gas source 59 which is activated by an activating means. The activating means comprises an opening mechanism 58, a pressure sensor 54 configured as a pressure plate and an acceleration sensor 57 each connected to the other by a traction means 56, for example a wire cable or Bowden cable. When involved in a rear-end impact a vehicle occupant 52 seated in the vehicle seat 50 is urged against the backrest 52 due to the mass inertia to thereby displace the pressure plate 54 against the force of the return springs 55. The acceleration sensor 57 does not release the traction cable 56 until the acceleration corresponds to the value of a rear-end impact so that the movement of the supporting plate is then passed on via the traction cable into the opening mechanism 58 which opens the gas source 59, for instance a gas cartridge, and thus inflate the protective cushion 60. Due to the function of the acceleration sensor 57 the traction means 56 is clamped in place as long as no rear-end impact is detected so that the gas source is unable to be activated solely by the pressure plate 54 being impressed which, for example, would be the case were the vehicle occupant to allow himself to drop into the seat heavily.

The invention thus also provides an activating means for an inflatable headrest without electronic or pyrotechnic components which reliably prevents activation as long as no rear-end impact is involved or the corresponding seat is unoccupied. Due to the absence of electronic and pyrotechnic components the means is not dependent on an external energy source and is accordingly less susceptible to trouble, although, of course, there is no problem in making use of a pyrotechnic gas generator as an alternative for inflating the protective cushion.

Figure 10:
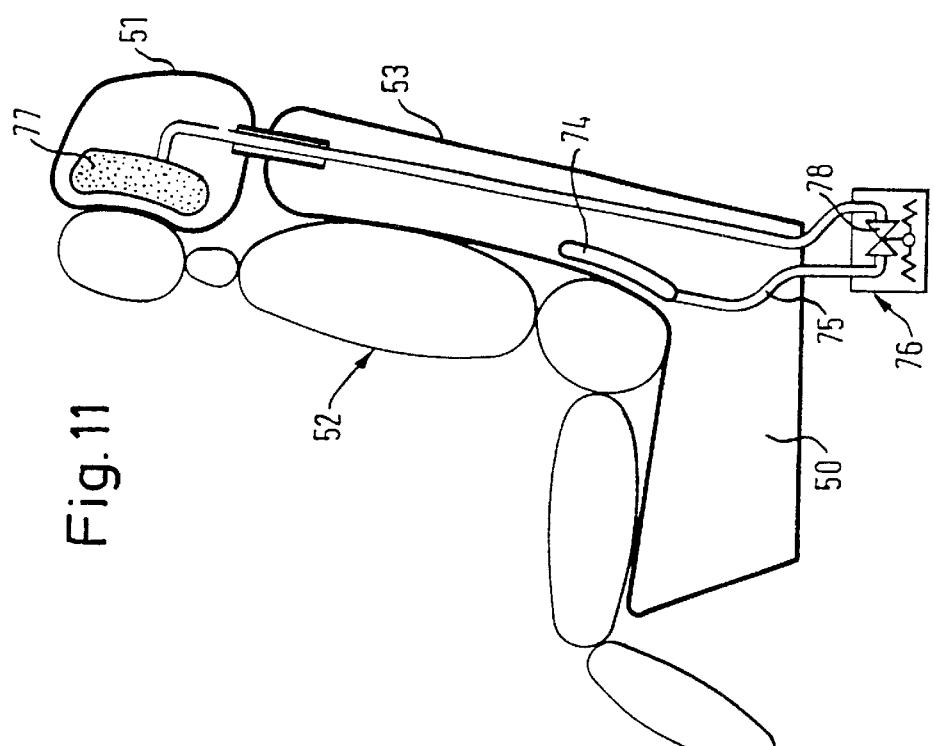
FIG. 10 is a schematic section through a vehicle seat including an activating means in accordance with a second embodiment of the invention in the non-activated condition of the headrest.
Figure 11:
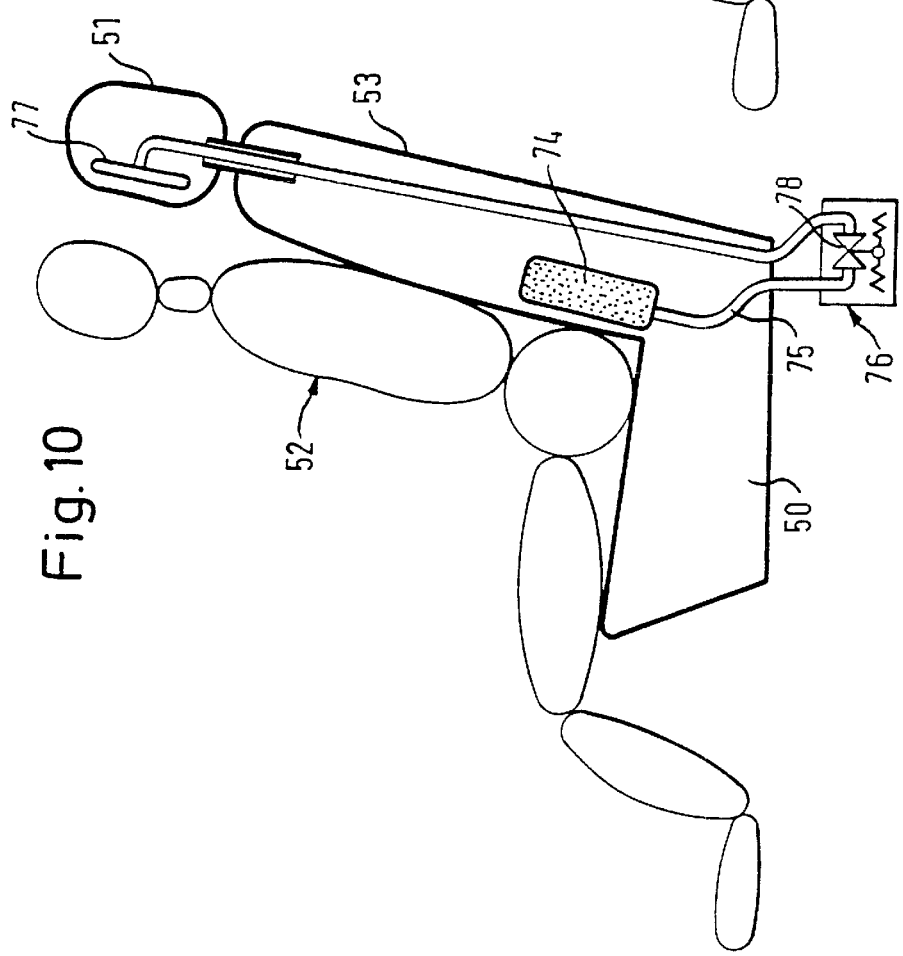
FIG. 11 illustrates the vehicle seat as shown in FIG. 10 but in the activated condition of the headrest.

Referring now to FIGS. 10 and 11 there is illustrated the pressure sensor configured as a gas bladder 74 in the backrest 53 connected by tubing 75 via the acceleration sensor 76 to the inflatable protective cushion 77 in the headrest 51. The acceleration sensor 76 comprises a valve 78 which shuts off the tubing 75 until an acceleration is sensed corresponding to a rear-end impact. In a rear-end impact (FIG. 11) the vehicle occupant 52 is urged into the backrest 53 and forces the gas from the gas bladder 74 through the tubing 75 via the opened valve 78 into the protective cushion 77 causing it to inflate and enabling it to develop its protective effect by enlargement and approximation of the headrest, as already described. Due to the activating means as described with reference to FIGS. 8 to 11 it is also prevented that the protective cushion 77 is inflated in the headrest 51 when the corresponding seat is unoccupied.

In this embodiment too, the absence of electronic and pyrotechnic components makes it independent of an external energy supply, it being even simpler and thus less susceptible to trouble due to the small number of mechanical components required, although, here too, there is no problem in making use of a pyrotechnic gas generator as an alternative for inflating the protective cushion.

What is claimed is:

1. A headrest comprising:
   an inflatable protective cushion for helping to protect a vehicle occupant in case of a rear-end impact, said protective cushion having an inflated condition and a non-inflated condition;
   a headrest frame member having an outer circumferential edge;
   an upholstery having a main body portion surrounded by an outer peripheral edge;
   a cover covering said upholstery and extending around said outer peripheral edge of said upholstery, said cover having an inner circumferential edge secured to said outer circumferential edge of said headrest frame member; and
   a clamping strip engaging said inner circumferential edge of said cover and clamping said inner circumferential edge of said cover to said outer circumferential edge of said headrest frame member,
   said protective cushion being arranged between said headrest frame member and said upholstery,
   said inner circumferential edge of said cover being maintained tensioned in said non-inflated condition of said protective cushion, and said main body portion of said upholstery and a portion of said cover being translatable away from said headrest frame member when said protective cushion changes from the non-inflated condition to the inflated condition.

2. The headrest according to claim 1 wherein said inner circumferential edge of said cover extends into an interior chamber of said headrest.

3. The headrest according to claim 1 wherein said inner circumferential edge of said cover is maintained in a tensioned condition by tensioning means in said non-inflated condition of said protective cushion.

4. The headrest according to claim 3 wherein said inner circumferential edge of said cover forms a loop, said tensioning means being an annular elastic traction means, said traction means being secured to said loop.

5. A headrest comprising:
   an inflatable protective cushion for helping to protect a vehicle occupant in case of a rear-end impact, said protective cushion having an inflated condition and a non-inflated condition;
   a headrest frame member having an outer circumferential edge;
   an upholstery having an outer peripheral edge; and
   a cover covering said upholstery and extending around said outer peripheral edge of said upholstery, said cover having an inner circumferential edge secured to said outer circumferential edge of said headrest frame member,
   said protective cushion being arranged between said headrest frame member and said upholstery,
   said inner circumferential edge of said cover being maintained tensioned in said non-inflated condition of said protective cushion, and said cover and said upholstery being displaceable away from said headrest frame member in the inflated condition of said inflatable protective cushion
   said inner circumferential edge of said cover being maintained in a tensioned condition by tensioning means in said non-inflated condition of said protective cushion,
   said inner circumferential edge of said cover forming a loop, said tensioning means being tensioned by said loop, and said tensioning means being further tensioned by a holding device on said headrest frame member.

6. The headrest according to claim 5 wherein said holding device comprises at least one holding pin, said holding pin being releasably held in place in a recess in said headrest frame member, a portion of said holding device being interposed between said upholstery and said protective cushion, said tensioning means releasing said holding pin from said recess upon inflation of said protective cushion thereby releasing the tension on said inner circumferential edge of said cover.

7. A headrest comprising:
   an inflatable protective cushion for helping to protect a vehicle occupant in case of a rear-end impact, said protective cushion having an inflated condition and a non-inflated condition;
   a headrest frame member having an outer circumferential edge;
   an elastic traction means;
   an upholstery having an outer peripheral edge; and
   a cover covering said upholstery and extending around said outer peripheral edge of said upholstery, said cover having an inner circumferential edge secured to said outer circumferential edge of said headrest frame member, said inner circumferential edge of said cover comprising a loop,
   said protective cushion being arranged between said headrest frame member and said upholstery,
   said traction means being secured to said loop, said traction means being further secured to a holding device on said headrest frame member, said holding device maintaining said traction means tensioned, said traction means maintaining said cover on said upholstery tensioned in said a non-inflated condition of said protective cushion, and said cover and said upholstery being displaceable away from said headrest frame member in the inflated condition of said inflatable protective cushion.

8. The headrest according to claim 7 wherein said holding device comprises at least one holding pin, said holding pin being releasably held in place in a recess in said headrest frame member, a portion of said traction means being interposed between said upholstery and said protective cushion, said traction means releasing said holding pin from said recess upon inflation of said protective cushion thereby releasing the tension on said inner circumferential edge of said cover.

9. The headrest according to claim 7 wherein said inner circumferential edge of said cover extends into an interior chamber of said headrest.

10. A headrest comprising:

an inflatable protective cushion for helping to protect a vehicle occupant in case of a rear-end impact, said protective cushion having an inflated condition and a non-inflated condition;

a headrest frame member having an outer circumferential edge;

an upholstery having an outer peripheral edge; and a cover covering said upholstery and having an inner circumferential edge secured to said outer circumferential edge of said headrest frame member, said inner circumferential edge of said cover being maintained tensioned in said non-inflated condition of said protective cushion, and said cover and said upholstery being displaceable away from said headrest frame member in the inflated condition of said inflatable protective cushion.

* * * * *